United States Patent [19]

Tsukada et al.

[11] Patent Number: 5,409,129
[45] Date of Patent: Apr. 25, 1995

[54] WELDED CANS

[75] Inventors: Shinichi Tsukada; Shunzo Miyazaki; Hideyuki Yoshizawa; Michiya Tamura; Koji Matsushima, all of Iwatsuki, Japan

[73] Assignee: Hokkai Can Co., Ltd., Tokyo, Japan

[21] Appl. No.: 813,938

[22] Filed: Dec. 27, 1991

[30] Foreign Application Priority Data

Dec. 28, 1990 [JP] Japan .................................. 2-409177

[51] Int. Cl.$^6$ ........................ B65D 23/02; B65D 25/14
[52] U.S. Cl. ..................................... 220/456; 220/457; 428/35.8; 428/35.9; 428/192; 428/458; 428/480; 428/910
[58] Field of Search ................ 220/456, 678, 680, 679, 220/457, 458; 428/35.8, 35.9, 458, 910, 192, 480; 426/131, 126

[56] References Cited

U.S. PATENT DOCUMENTS

| | | | |
|---|---|---|---|
| 4,382,525 | 5/1983 | Kobayashi et al. | 220/456 |
| 4,387,830 | 6/1983 | Kitamura et al. | 220/456 |
| 4,477,501 | 10/1984 | Kojima | 220/678 |
| 4,735,835 | 4/1988 | Taira et al. | 220/456 |
| 4,916,031 | 4/1990 | Kitamura et al. | 220/680 |

FOREIGN PATENT DOCUMENTS

| | | |
|---|---|---|
| 61-232148 | 10/1986 | Japan . |
| 1192545 | 2/1989 | Japan . |
| 1070352 | 3/1989 | Japan . |
| 213896 | 4/1990 | Japan . |
| 2242738 | 9/1990 | Japan . |
| 2164899 | 4/1986 | United Kingdom . |

*Primary Examiner*—Ellis P. Robinson
*Assistant Examiner*—Rena L. Dye
*Attorney, Agent, or Firm*—Birch, Stewart, Kolasch & Birch

[57] ABSTRACT

A tinned steel sheet having a tin deposit obtained by evenly plating tin on the surface of a base steel sheet at a deposition rate of 0.5–1.7 g/m$^2$ is used as a surface-treated steel sheet for forming a can body. A biaxially oriented polyester film having a thickness of 5–50 μm is caused to adhere to the surface-treated steel sheet with a thermosetting resin adhesive at a temperature of 180°–225° C. as a protective coat. The tinned steel sheet has, on its both ends, two layers of a tin-iron alloy layer having a deposition rate of 0.35–1.60 g/m$^2$ in terms of tin content and a tin layer having a tin deposition rate of 0.10–1.35 g/m$^2$ at a stage after the adhesion of the polyester film but before welding. Said both ends of the surface-treated steel sheet are welded to each other, and another protective coat is applied to a portion of the inner surface, which is not covered with the first-mentioned protective coat, thereby forming a welded can.

18 Claims, No Drawings

WELDED CANS

BACKGROUND OF THE INVENTION

1. Field of the Invention

The present invention relates to welded cans making use of a surface-treated steel sheet plated with tin as a raw material and having a protective coat on at least the inner surface of a can body.

2. Description of the Related Art

In recent years, welded cans have come to be used as food or beverage cans. Tinned steel sheets (tinplate sheets) are generally used for such welded cans because they can be welded at a low temperature. Tin deposit is also known to have a function of protecting a base steel sheet against corrosion by contents. As such tinned steel sheets, those having a tin deposition rate of at least 2.8 $g/m^2$ and used for soldered cans have generally been used to date. However, there has recently been a tendency to use steel sheets low in tin deposition rate as raw materials for welded cans because the price of tin has been tending upward for reasons of resources.

However, a welded can making use of a steel sheet whose tin deposition rate is lowered is accompanied by the following problem. When such a steel sheet is subjected to a heat treatment such as coating or printing in a can processing step, tin plated on a base steel sheet fuses to form a tin-iron alloy, which has a high melting point and is hard to weld, together with the base steel sheet, so that the amount of pure tin required for welding is decreased, and the strength of the can at a welded joint hence becomes insufficient. The reduction of the tin deposition rate is also accompanied by a problem that the corrosion resistance against the contents of the welded can is lowered.

Therefore, it has been proposed to achieve excellent weld quality while lowering the tin deposition rate and at the same time, to form a protective coat on a portion of the tinned steel sheet, which corresponds to at least an inner surface of a can body, with the exception of both ends, thereby aiming at ensuring the corrosion resistance of the welded can.

For example, as described in Japanese Patent Publication No. 13896/1990, the present inventors proposed a welded can obtained by using a tinned steel sheet having a tin layer obtained by evenly plating tin on the surface of a base steel sheet at a deposition rate of 0.5–1.7 $g/m^2$, and forming a coating layer composed of a thermosetting epoxy-phenolic resin coating on a portion of the surface-treated steel sheet, which corresponds to at least the inner surface of a can body, with the exception of both ends. On the base steel sheet of the welded can, at least two layers of a tin-iron alloy layer having a deposition rate of 0.35–1.60 $g/m^2$ in terms of tin content and a tin layer having a tin deposition rate of 0.10–1.35 $g/m^2$ are formed in that order at a stage after baking for coating but before welding.

At the stage before welding, the base steel sheet securely holds the tin layer on its surface at a tin deposition rate of 0.10–1.35 $g/m^2$. Therefore, it can obtain sufficient weld strength. The reduction of corrosion resistance against the contents of the welded can due to the lowering of the tin deposition rate is also made up by the coating layer composed of the thermosetting epoxy-phenolic resin coating.

According to a further study of the present inventors, it is however apprehended that since the coating layer is a coating film formed by applying the thermosetting epoxy-phenolic resin coating and baking it, iron may dissolve out in the contents from pin-holes if any pin-holes generate upon the application of the coating, and low-molecular weight components in the coating film may affect the flavor of the contents.

As described in Japanese Patent Application Laid-Open No. 232148/1986, the present inventors also proposed a welded can obtained by using a tinned steel sheet having a tin-iron alloy layer, a tin layer and a chromium.chromate film in that order on the surface of a base steel sheet and forming a coating layer composed of a thermosetting epoxy-phenolic resin coating on a portion of the surface-treated steel sheet, which corresponds to at least the inner surface of a can body, with the exception of both ends. On the base steel sheet of the welded can, a tin layer having a tin deposition rate of at least 0.05 $g/m^2$ and distributed in a range of 10–60% of the surface area of the base steel sheet is formed at a stage after baking for coating but before welding. This tin layer is formed in a mottled or islandlike state.

At the stage before welding, the base steel sheet described in the above official gazette securely holds on its surface a tin layer having a tin deposition rate of at least 0.05 $g/m^2$ and formed in a mottled or islandlike state. Therefore, it can obtain sufficient weld strength. The reduction of corrosion resistance against the contents of the welded can due to the lowering of the tin deposition rate is also made up by the coating layer composed of the thermosetting epoxy-phenolic resin coating.

It is however apprehended that since the coating layer is composed of a thermosetting epoxy-phenolic resin coating like that described in Japanese Patent Publication No. 13896/1990, iron may dissolve out in the contents, and the flavor of the contents may be adversely affected.

SUMMARY OF THE INVENTION

Accordingly, the present invention has been made with a view toward solving the above-mentioned problems and has as its object the provision of a welded can having a protective coat which can prevent the dissolution of iron in the contents of the can and the change of flavor of the contents, and permitting the possession of sufficient weld strength at its welded joint.

The present inventors has carried out an extensive investigation with a view toward solving the above-described problems. As a result, it has been found that when a polyester film is caused to adhere to a tinned steel sheet using a specified thermosetting adhesive in a temperature range lower than the melting point of tin, a protective coat excellent in strength, transparency and suitability to the contents of a welded can such as retention of good flavor can be formed on a surface of a base steel sheet without lowering the tin deposition rate, leading to completion of this invention.

In an aspect of this invention, there is thus provided a welded can in which a protective coat is formed on a portion of a surface-treated steel sheet for cans, which corresponds to at least the inner surface of a can body, with the exception of both ends, and both ends of the surface-treated steel sheet are overlapped to each other to weld them, thereby forming a can body, characterized in that a tinned steel sheet having a tin deposit obtained by evenly plating tin on the surface of a base steel sheet at a deposition rate of 0.5–1.7 $g/m^2$ is used as the surface-treated steel sheet for forming the can body, a biaxially oriented polyester film having a thickness of 5-50 μm is caused to adhere to the surface-treated steel sheet with a thermosetting resin adhesive at a temperature in a range of 180°-225° C. as the protective coat, both ends of the surface-treated steel sheet, which have at least two layers of a tin-iron alloy layer having a deposition rate of 0.35-1.60 g/m² in terms of tin content and a tin layer having a tin deposition rate of 0.10-1.35 g/m² at a stage after the adhesion of the polyester film but before welding, are welded to each other, and another protective coat is applied to a portion of the inner surface, which is not covered with the first-mentioned protective coat.

In general, the tin-iron alloy layer, which is a constituent for forming the deposit of the tinned steel sheet, is not always evenly covered by the tin layer as its outer layer, but the tin-iron alloy layer and/or the base steel sheet may be locally exposed in some cases. Its degree varies according to the production method of the tinned steel sheet even if the thickness of the tin-iron alloy layer and tin layer is equal. So-called no reflow type tinned steel sheet has less tendency to expose the tin-iron alloy layer compared with a reflow type tinned steel sheet. In this invention, it is preferable to use a tinned steel sheet obtained by no reflowing, which shows less tendency to expose the tin-iron alloy layer.

In another aspect of this invention, there is also provided a welded can in which a protective coat is formed on a portion of a surface-treated steel sheet for cans, which corresponds to at least the inner surface of a can body, with the exception of both ends, and both ends of the surface-treated steel sheet are overlapped to each other to weld them, thereby forming a can body, characterized in that a tinned steel sheet having an under coat composed of a metallic nickel on the surface of a base steel sheet and a tin deposit obtained by plating tin on the under coat at a deposition rate of 0.5-1.7 g/m² is used as the surface-treated steel sheet for forming the can body, a biaxially oriented polyester film having a thickness of 5-50 μm is caused to adhere to the surface-treated steel sheet with a thermosetting resin adhesive at a temperature in a range of 180°-225° C. as the protective coat, both ends of the surface-treated steel sheet, which have a tin layer having a tin deposition rate of at least 0.10 g/m² and formed with it dispersed in a range of 10-60% of the surface area of the base steel sheet at a stage after the adhesion of the polyester film but before welding, are welded to each other, and another protective coat is applied to a portion of the inner surface, which is not covered with the first-mentioned protective coat.

Although the corrosion resistance of the surface-treated steel sheet can be improved by using an under coat containing 5-200 mg/m² of metallic nickel, its weldability is lowered if the content of nickel is higher than the upper limit of the above range.

The tin layer formed with it dispersed in a range of 10-60% of the surface area of the base steel sheet in the tinned steel sheet is derived from the constitution of the tin deposit of the surface-treated steel sheet as an origin. The method of forming the tin layer includes a method wherein the tin deposit is unevenly applied to the steel sheet, a method wherein a reflowing step after the tinning is carried out under specific conditions, and a combination thereof. The method in which the tin deposit is unevenly applied to the steel sheet includes a method to introduce an electroplating step under too high or low current density in the course of a series of plating steps. Examples of the method using the reflowing step include a conventionally used method in which the dipping of a steel sheet into a flux solution is stopped to unevenly fuse tin by reflowing.

In a further aspect of this invention, there is provided a welded can in which a protective coat is formed on a portion of a surface-treated steel sheet for cans, which corresponds to at least the inner surface of a can body, with the exception of both ends, and both ends of the surface-treated steel sheet are overlapped to each other to weld them, thereby forming a can body, characterized in that a thinly tinned steel sheet having an under coat composed of a metallic chromium on the surface of a base steel sheet and a tin deposit obtained by plating tin on the under coat at a deposition rate of 0.1-1.7 g/m² is used as the surface-treated steel sheet for forming the can body, a biaxially oriented polyester film having a thickness of 5-50 μm is caused to adhere to the surface-treated steel sheet with a thermosetting resin adhesive at a temperature in a range of 180°-225° C. as the protective coat, both ends of the surface-treated steel sheet are welded to each other, and another protective coat is applied to a portion of the inner surface, which is not covered with the first-mentioned protective coat.

Although the growth of a tin-iron alloy layer on the base steel sheet due to a heat treatment can be controlled by using an under coat containing 10-200 mg/m² of metallic chromium, its weldability is lowered if the content of chromium is higher than the upper limit of the above range.

These and other objects and features of the present invention will become apparent from the preferred embodiments of this invention, which will be described subsequently in detail.

DETAILED DESCRIPTION OF THE INVENTION AND PREFERRED EMBODIMENTS

In the welded cans according to this invention, the biaxially oriented polyester film is excellent in strength, transparency and suitability to the contents of the welded cans such as retention of good flavor. If the thickness of the film is thinner than 5 μm, its effects to prevent both corrosion of the can and dissolution of metal can not be exhibited sufficiently. On the other hand, any polyester films having a thickness exceeding 50 μm become poor in processability. It is hence not preferable to use any polyester films having a thickness outside the above range.

Polyesters used in forming the above-described biaxially oriented film may include any polyesters obtained by polycondensation of a dicarboxylic acid component and a diol component. However, polyesters obtained by polycondensation of an aromatic dicarboxylic acid such as terephthalic acid, isophthalic acid or naphthalene dicarboxylic acid and a diol such as ethylene glycol, propylene glycol or butylene glycol are preferred, with a polyester (polyethylene terephthalate) obtained by polycondensation of terephthalic acid and ethylene glycol being especially preferred. In addition to the above-described dicarboxylic acid component or diol component, the above-mentioned polyesters may contain one or more other dicarboxylic acid components or diol components if desired.

As the above-mentioned polyesters other than polyethylene terephthalate, may be mentioned polyesters described in Japanese Patent Application Laid-Open Nos. 42786/1976, 70352/1989, 242738/1990, etc.

In the welded cans according to this invention, the biaxially oriented polyester film is caused to adhere to the surface-treated steel sheet using a thermosetting resin adhesive under heating in a temperature range of 180°–225° C. Any heating temperatures lower than 180° C. involve a potential problem that the biaxially oriented polyester film is peeled off by a heat treatment in a retort sterilization process after filling the welded can with its contents. On the other hand, any temperatures higher than 225° C. result in the reduction of the tin deposition rate on the surface of the surface-treated steel sheet and hence, insufficient weld strength is given at a welded joint. It is thus undesirable to heat at any temperatures outside the above range.

Any thermosetting resin adhesives may be used so long as they are hardened in a temperature range of 180°–250° C. As examples of the thermosetting resin adhesive, may be mentioned adhesives composed of one of epoxy resins, phenolic resins, acrylic resins, aminoplast resins, polyester resins, urethane resins and polysiloxane resins, or a mixture of two or more resins. In particular, thermosetting resin adhesives composed of a bisphenol type epoxy resin and a resol type phenolic resin, a polyester resin and an aminoplast resin, and an acrylic resin and an aminoplast resin are preferred owing to their shortened hardening time and easy processability.

In the thermosetting resin adhesive composed of the bisphenol type epoxy resin and resol type phenolic resin, the bisphenol type epoxy resin and the resol type phenolic resin preferably have a number average molecular weight of 2000–5500 and 600–900, respectively. The proportion of the bisphenol type epoxy resin to the resol type phenolic resin is in a range of 50/50 to 98/2 by weight with 80/20 being especially preferred.

In the thermosetting resin adhesive composed of the polyester resin and aminoplast resin, the proportion of the polyester resin to the aminoplast resin is in a range of 50/50 to 98/2 by weight with 80/20 being especially preferred.

In the thermosetting resin adhesive composed of the acrylic resin and aminoplast resin, the proportion of the acrylic resin to the aminoplast resin is in a range of 50/50 to 98/2 by weight with 80/20 being especially preferred.

In the above-described thermosetting resin adhesives, the epoxy resin, polyester resin and acrylic resin are individually a principal agent, and the phenolic resin and aminoplast resin are individually a hardener. In the above formulation, any adhesives containing the hardener in an amount lower than 2 wt. % show tendency to harden insufficiently. On the other hand, any amounts higher than 50 wt. % result in a brittle adhesive layer after hardening and there is hence a tendency to become liable to peel off the biaxially oriented polyester film when the surface-treated steel sheet is rounded to weld it.

In the welded cans according to this invention, the surface-treated steel sheet with tin plated thereon is exposed without covering with the biaxially oriented polyethylene film in and around the welded joint. Accordingly, a protective resin coat is applied to the exposed portion on the inside of the can body, thereby conducting coat compensation of the welded joint.

The above resin coat is preferably excellent in adhesion to the polyester film adhered to the surface-treated steel sheet and the tinned steel sheet and also superb in suitability to the contents after formation into a welded can, heat resistance for heat sterilization, corrosion resistance, etc. As such a resin, may be used an epoxy-phenolic resin conventionally used. However, polyester resins are suitable for use in this invention. In particular, a polyester copolymer resin obtained by substituting a part of at least one of a terephthalic acid component and an ethylene glycol component by another dicarboxylic acid or diol, or a resin having the same composition as that in the above-described biaxially oriented polyester film is preferred. It may be used as a solvent-type coating or powder coating, or in the form of a film.

When the solvent-type coating such as an epoxy resin coating, or the powder coating is used, the above coat compensation may be conducted by applying this coating to the exposed portion in accordance with the conventionally-known method. Alternatively, it may be carried out by forming the same biaxially oriented polyethylene film as that used in the above-mentioned protective coat into a tape somewhat wider than the width of the exposed portion, applying the tape like film to the exposed portion and its surrounding area through a thermosetting adhesive and then heating the adhesive to harden it, or directly applying the film to the exposed portion and its surrounding area and then heating the film at a temperature not lower than the melting point of the film to fusion-bond the film. It is preferable to use the same adhesive as that used in the adhesion of the biaxially oriented polyester film as the thermosetting adhesive to be used in the adhesion of the tape like film.

In this invention, a polyester film may also be laminated on the outside of the can body. Such a polyethylene film may be printed. As an adhesive for the printed film, may be used the same adhesive as that used in the lamination of the protective polyester film. However, a polyester resin adhesive is suitable for use in that it has a fast color. From the view point of the shielding ability of the base steel sheet, a suitable amount of a white pigment or the like may be used in the adhesive if desired.

Although an extremely thin chromate layer is generally provided on the surface of the tinned steel sheet, such a chromate layer is thinner than the tin deposit, so that it has no particular influence on the effects of any tin deposits according to this invention. Therefore, the chromate layer may be provided on any tin deposits of this invention as usual.

According to an aspect of this invention, in which a tinned steel sheet having a tin deposit obtained by evenly plating tin on the surface of a base steel sheet at a deposition rate of 0.5–1.7 $g/m^2$ is used as the surface-treated steel sheet for forming a can body, the base steel sheet has, on its surface, two layers of a tin-iron alloy layer having a deposition rate of 0–1.2 $g/m^2$ in terms of tin content and a tin layer having a tin deposition rate of 0.5–1.6 $g/m^2$ at a stage of its original sheet. The growth of the tin-iron alloy layer is also controlled by heating. Moreover, since the adhesion of the biaxially oriented polyester film is conducted in a temperature range of 180°–225° C. using the thermosetting resin adhesive, the formation of an alloy of tin and iron is suppressed. Therefore, two layers of a tin-iron alloy layer having a deposition rate of 0.35–1.60 $g/m^2$ in terms of tin content and a tin layer having a tin deposition rate of 0.10–1.35 $g/m^2$ are formed on the surfaces of both ends of the surface-treated steel sheet at a stage when the protective coat by the polyester film has been formed. The tin deposition rate of 0.10–1.35 $g/m^2$ in the tin layer is sufficient to weld the overlapped ends of the surface-treated steel sheet to each other.

Furthermore, since another protective coat is applied to the exposed portion not covered with the polyester film after the welding, there is provided a welded can having a protective coat which can prevent the dissolution of iron in the contents and the change of flavor of the contents, and possessing sufficient weld strength at its welded joint.

According to another aspect of this invention, in which a tinned steel sheet having an under coat composed of a metallic nickel on the surface of a base steel sheet and a tin deposit obtained by plating tin on the under coat at a deposition rate of 0.5–1.7 $g/m^2$ is used as the surface-treated steel sheet for forming the can body, the corrosion resistance of the base steel sheet is improved by the under coat. The under coat is formed as a metallic nickel-containing layer on the surface of the base steel sheet. Although this surface-treated steel sheet has, on its surface, a tin layer having a tin deposition rate of 0.5–1.7 $g/m^2$ at a stage of its original sheet, the adhesion of the biaxially oriented polyester film is conducted in a temperature range of 180°–225° C. using the thermosetting resin adhesive, so that the formation of an alloy of tin and iron is suppressed. Therefore, a tin layer having a tin deposition rate of at least 0.10 $g/m^2$ and dispersed in a range of 10–60% of the surface area of the base steel sheet is formed on the surfaces of both ends of the surface-treated steel sheet at a stage when the protective coat by the polyester film has been formed. This tin layer contains tin in an amount sufficient to weld the overlapped ends of the surface-treated steel sheet to each other. Furthermore, since another protective coat is applied to the exposed portion not covered with the polyester film after the welding, there is provided a welded can having a protective coat which can prevent the dissolution of iron in the contents and the change of flavor of the contents, and possessing sufficient weld strength at its welded joint.

According to a further aspect of this invention, in which a tinned steel sheet having an under coat composed of a metallic chromium on the surface of a base steel sheet and a tin deposit obtained by plating tin on the under coat at a deposition rate of 0.1–1.7 $g/m^2$ is used as the surface-treated steel sheet for forming the can body, the tin deposit is shielded from the base steel sheet by the under coat. Therefore, the formation of a tin-iron alloy layer is prevented even when the steel sheet is heated, and tin in an amount required for welding is hence ensured. Moreover, since the adhesion of the biaxially oriented polyester film is conducted in a temperature range of 180°–225° C. using the thermosetting resin adhesive, the fusion of tin is avoided. Therefore, the adhesion of the polyester film is ensured. Furthermore, since another protective coat is applied to the exposed portion not covered with the polyester film after the welding, there is provided a welded can having a protective coat which can prevent the dissolution of iron in the contents and the change of flavor of the contents, and possessing sufficient weld strength at its welded joint.

Accordingly, the present invention permits the formation of a protective coat which can prevent the dissolution of iron in the contents and the change of flavor of the contents by causing the biaxially oriented polyester film to adhere. Since the formation of the protective coat can also prevent the reduction in the tin deposition rate, a welded can having sufficient weld strength at its welded joint can be obtained.

The present invention will hereinafter be described in detail by the following exemplary embodiments. However, it should be borne in mind that this invention is not limited to and by the following examples and comparative examples.

EXAMPLES

EXAMPLE 1

Tin was plated on both sides of a steel sheet having a thickness of 0.2 mm at a deposition rate of 1.2 $g/m^2$ to prepare a tinned steel sheet. In the tinned steel sheet, a tin deposit is evenly formed on the surface of a base steel sheet free from the formation of an under coat, and a chromate treatment is further conducted on the tin deposit.

An epoxy-phenolic resin adhesive containing a bisphenol A type epoxy resin having a number average molecular weight of 5500 and a resol type phenolic resin having a number average molecular weight of 700 in a weight ratio of 80:20 was then coated on one side of a biaxially oriented polyethylene terephthalate (hereinafter abbreviated as "PET") film having a thickness of 12 μm to give a dry coat weight of 2 $g/m^2$ and predried. The thus-coated film was then laminated under pressure with its adhesive-coated side faced to the tinned steel sheet on both sides of the tinned steel sheet heated to 210° C. with the exception of both ends which were to become a welded joint. The thus-obtained laminate was then subjected to a heat treatment at 210° C. for 3 minutes, thereby preparing a metal blank for use in production of a welded can.

On the base steel sheet of the metal blank, a tin-iron alloy layer having a deposition rate of 0.50 $g/m^2$ in terms of tin content and a tin layer having a tin deposition rate of 0.70 $g/m^2$ are formed in that order.

The metal blank was then rounded so as to overlap the ends, on which the film was not laminated, to each other. The ends were welded to each other using a known pressure seam welder, thereby producing a can body. A solvent-type epoxy-phenolic resin coating containing a bisphenol A type epoxy resin having a number average molecular weight of 3750 and a resol type phenolic resin having a number average molecular weight of 690 in a weight ratio of 85:15 was then applied onto an area in and around the welded joint on the inside of the can body, said area being not laminated with the film, and onto the film in the vicinity thereof, and baked at 210° C. for 60 seconds to form a resin coat, thereby conducting coat compensation.

The can body subjected to the coat compensation was then subjected to neck-in forming and flange forming at both ends thereof. A metal can end having a coating on the inside thereof was attached to one end of the can body thus processed by double seaming to obtain a welded can.

The enamel rate value (ERV) of the thus-obtained welded can was measured. As a result, it was confirmed that the welded can had no metal-exposed portion on its surface and the adhesion of the film was hence good. The ERV of the welded can is shown in Table 1. By the way, the term "ERV" means a value of electric current for 4 seconds when a voltage of 6.2 V is applied in a 1% saline solution. The degree of exposed metal in a sample is judged according to the magnitude of ERV.

Coffee and milk as contents were then filled in the welded can, and a metal can end having a coating on the inside thereof was attached to an open end of the welded can by double seaming to obtain a sealed can. The sealed can was subjected to a heat sterilization treatment and stored for 6 months at room temperature. Thereafter, the sealed can was opened to investigate whether iron dissolved out in the contents, the inner surface of the can body was corroded and the flavor of the contents changed. The results are shown in Table 1.

Comparative Example 1

A metal blank for use in production of a welded can was prepared in the same manner as in Example 1 except that tin was plated at a deposition rate of 0.45 g/m$^2$ to prepare a tinned steel sheet. A tin-iron alloy layer having a deposition rate of 0.45 g/m$^2$ in terms of tin content was formed on the base steel sheet of the metal blank, and no metallic tin remained.

Using the metal blank, its welding was conducted in the same manner as in Example 1 to intend to produce a welded can. However, no welded can was obtained due to its poor weldability.

Comparative Example 2

Using a tinned steel sheet similar to that used in Example 1, a welded can was obtained in the same manner as in Example 1 except that a solvent-type epoxy-phenolic resin coating containing a bisphenol A type epoxy resin having a number average molecular weight of 3750 and a resol type phenolic resin having a number average molecular weight of 690 in a weight ratio of 85:15 was coated on the inside of the tinned steel sheet with the exception of both ends, which were to become a welded joint, and baked at 205° C. for 10 minutes to form a coating film having a thickness of 5.2 μm, and print coating was conducted on the outside, instead of laminating the biaxially oriented PET film on both sides of the tinned steel sheet, thereby preparing a metal blank for use in production of a welded can.

The ERV of the thus-obtained welded can was measured. As a result, it was confirmed that the welded can had many metal-exposed portions on its surface compared with the film-laminated welded can in Example 1. The ERV of the welded can is shown in Table 1.

Using the welded can, a sealed can was then produced in the same manner as in Example 1. The sealed can was subjected to a heat sterilization treatment and stored for 6 months at room temperature. Thereafter, the sealed can was opened to investigate whether iron dissolved out in the contents, the inner surface of the can body was corroded and the flavor of the contents changed. The results are shown in Table 1.

TABLE 1

|  | Ex. 1 | Comp. Ex. 1 | Comp. Ex. 2 |
|---|---|---|---|
| Deposition rate of tin (g/m$^2$) | 1.2 | 0.45 | 1.2 |
| Lamination of film | Conducted | Conducted | Not conducted |
| Rate of tin in tin-iron alloy layer (g/m$^2$) | 0.50 | 0.45 | 0.50 |
| Rate of tin in tin layer (g/m$^2$) | 0.70 | 0 | 0.70 |
| Weldability | AA | BB | AA |
| ERV (mA) | 0.1 | — | 8.0 |
| Dissolution of iron | AA | — | AA |
| Corrosion of inner surface of can body | AA | — | BB |
| Flavor | AA | — | BB |

Weldability: AA=Good, BB=Poor.
Dissolution of iron: AA=Not dissolved, BB=Dissolved.
Corrosion of inner surface of can body: AA=Not corroded, BB=Somewhat corroded.
Flavor: AA=Not changed, BB=Somewhat changed.

EXAMPLE 2

After nickel was plated on both sides of a steel sheet having a thickness of 0.2 mm at a deposition rate of 70 mg/m$^2$ to form a nickel under coat, tin was plated on the under coat at a deposition rate of 0.7 g/m$^2$ to prepare a tinned steel sheet. A chromate treatment is further conducted on the tin deposit of the tinned steel sheet.

An epoxy-phenolic resin adhesive containing a bisphenol A type epoxy resin having a number average molecular weight of 5500 and a resol type phenolic resin having a number average molecular weight of 700 in a weight ratio of 80:20 was then coated on one side of a biaxially oriented PET film having a thickness of 12 μm to give a dry coat weight of 2 g/m$^2$ and predried. The thus-coated film was then laminated under pressure with its adhesive-coated side faced to the tinned steel sheet on both sides of the tinned steel sheet heated to 210° C. with the exception of both ends which were to become a welded joint. The thus-obtained laminate was then subjected to a heat treatment at 210° C. for 3 minutes, thereby preparing a metal blank for use in production of a welded can. On the base steel sheet of the metal blank, a tin layer having a tin deposition rate of 192 mg/m$^2$ was formed with it dispersed in an islandlike state in a range of 29% of the surface of the base steel sheet.

A welded can was obtained in the same manner as in Example 1 except that the above-obtained tinned steel sheet was used.

The ERV of the thus-obtained welded can was measured. As a result, it was confirmed that the welded can had no metal-exposed portion on its surface and the adhesion of the film was hence good. The ERV of the welded can is shown in Table 2.

Using the welded can, a sealed can was then produced in the same manner as in Example 1. The sealed can was subjected to a heat sterilization treatment and stored for 6 months at room temperature. Thereafter, the sealed can was opened to investigate whether iron dissolved out in the contents, the inner surface of the can body was corroded and the flavor of the contents changed. The results are shown in Table 2.

Comparative Example 3

A metal blank for use in production of a welded can was prepared in the same manner as in Example 2 except that the adhesive-coated PET film was laminated under pressure with its adhesive-coated side faced to the tinned steel sheet on both sides thereof, and the resulting laminate was subjected further to a heat treatment at 175° C. for 3 minutes.

A welded can was obtained in the same manner as in Example 2 except that the above-obtained tinned steel sheet was used.

The ERV of the thus-obtained welded can was measured. As a result, it was confirmed that the welded can had no metal-exposed portion on its surface and the adhesion of the film was hence good. The ERV of the welded can is shown in Table 2.

Using the welded can, a sealed can was then produced in the same manner as in Example 2. The sealed can was heated to subject it to a retort sterilization treatment. As a result, the PET film was peeled off. The results are shown in Table 2.

Comparative Example 4

A metal blank for use in production of a welded can was prepared in the same manner as in Example 2 except that the adhesive-coated PET film was laminated under pressure with its adhesive-coated side faced to the tinned steel sheet on both sides thereof, and the resulting laminate was subjected further to a heat treatment at 230° C. for 3 minutes. No metallic tin remained on the base steel sheet of the metal blank.

Using the metal blank, its welding was conducted in the same manner as in Example 2 to intend to produce a welded can. However, no welded can was obtained due to its poor weldability.

Comparative Example 5

A metal blank for use in production of a welded can was prepared in the same manner as in Example 2 except that tin was plated at a tin deposition rate of 0.3 g/m$^2$ to prepare a tinned steel sheet. No metallic tin remained on the base steel sheet of the metal blank.

Using the metal blank, its welding was conducted in the same manner as in Example 2 to intend to produce a welded can. However, no welded can was obtained due to its poor weldability.

TABLE 2

|  | Ex. 2 | Comp. Ex. 3 | Comp. Ex. 4 | Comp. Ex. 5 |
|---|---|---|---|---|
| Deposition rate of tin (g/m$^2$) | 0.7 | 0.7 | 0.7 | 0.3 |
| Nickel under coat (mg/m$^2$) | 70 | 70 | 70 | 70 |
| Heat conditions |  |  |  |  |
| (°C.) | 210 | 175 | 230 | 210 |
| (min) | 3 | 3 | 3 | 3 |
| Rate of tin in tin layer (g/m$^2$) | 0.192 | 0.3 | 0 | 0 |
| State of tin layer | Island-like | Island-like | — | — |
| Weldability | AA | AA | BB | BB |
| ERV (mA) | 0.1 | 0.1 | — | — |
| Dissolution of iron | AA | — | — | — |
| Corrosion of inner surface of can body | AA | — | — | — |
| Flavor | AA | — | — | — |

Weldability: AA=Good, BB=Poor.
Dissolution of iron: AA=Not dissolved, BB=Dissolved.
Corrosion of inner surface of can body: AA=Not corroded, BB=Somewhat corroded.
Flavor: AA=Not changed, BB=Somewhat changed.

EXAMPLE 3

A welded can was obtained in the same manner as in Example 2 except that an adhesive containing a polyester resin and an aminoplast resin in a weight ratio of 80:20 was used instead of the epoxy-phenolic resin adhesive used in Example 2.

The ERV of the thus-obtained welded can was measured. As a result, it was confirmed that the welded can had no metal-exposed portion on its surface and the adhesion of the film was hence good. The ERV of the welded can is shown in Table 3.

Using the welded can, a sealed can was then produced in the same manner as in Example 2. The sealed can was subjected to a heat sterilization treatment and stored for 6 months at room temperature. Thereafter, the sealed can was opened to investigate whether iron dissolved out in the contents, the inner surface of the can body was corroded and the flavor of the contents changed. The results are shown in Table 3.

EXAMPLE 4

A welded can was obtained in the same manner as in Example 2 except that an adhesive containing an acrylic resin and an aminoplast resin in a weight ratio of 80:20 was used instead of the epoxy-phenolic resin adhesive used in Example 2.

The ERV of the thus-obtained welded can was measured. As a result, it was confirmed that the welded can had no metal-exposed portion on its surface and the adhesion of the film was hence good. The ERV of the welded can is shown in Table 3.

Using the welded can, a sealed can was then produced in the same manner as in Example 2. The sealed can was subjected to a heat sterilization treatment and stored for 6 months at room temperature. Thereafter, the sealed can was opened to investigate whether iron dissolved out in the contents, the inner surface of the can body was corroded and the flavor of the contents changed. The results are shown in Table 3.

EXAMPLE 5

Using the same metal blank as that used in Example 2, a can body was produced in the same manner as in Example 2. A welded can was obtained in the same manner as in Example 2 except that powdery polyester having a particle size of 30 μm was applied by powder coating onto an area in and around the welded joint on the inside of the can body, said area being not laminated with the film, and onto the film in the vicinity thereof, and heated at 200° C. for 2 minutes to form a resin coat having a thickness of 30 μm, thereby conducting coat compensation.

The ERV of the thus-obtained welded can was measured. As a result, it was confirmed that the welded can had no metal-exposed portion on its surface and the adhesion of the film was hence good. The ERV of the welded can is shown in Table 3.

Using the welded can, a sealed can was then produced in the same manner as in Example 1. The sealed can was subjected to a heat sterilization treatment and stored for 6 months at room temperature. Thereafter, the sealed can was opened to investigate whether iron dissolved out in the contents, the inner surface of the can body was corroded and the flavor of the contents changed. The results are shown in Table 3.

EXAMPLE 6

Using the same metal blank as that used in Example 2, a can body was produced in the same manner as in Example 2. A welded can was obtained in the same manner as in Example 2 except that a tape like film obtained by applying an epoxy-phenolic resin adhesive on one side of a biaxially oriented PET film having a thickness of 12 μm to give a dry coat weight of 2 g/m² and predrying the adhesive was laminated under pressure in a heated state onto an area in and around the welded joint on the inside of the can body, said area being not laminated with the film, and onto the film in the vicinity thereof to form a resin coat, thereby conducting coat compensation. Incidentally, the adhesive used is the same as that used in Example 1.

The ERV of the thus-obtained welded can was measured. As a result, it was confirmed that the welded can had no metal-exposed portion on its surface and the adhesion of the film was hence good. The ERV of the welded can is shown in Table 3.

Using the welded can, a sealed can was then produced in the same manner as in Example 1. The sealed can was subjected to a heat sterilization treatment and stored for 6 months at room temperature. Thereafter, the sealed can was opened to investigate whether iron dissolved out in the contents, the inner surface of the can body was corroded and the flavor of the contents changed. The results are shown in Table 3.

TABLE 3

|  | Ex. 3 | Ex. 4 | Ex. 5 | Ex. 6 |
| --- | --- | --- | --- | --- |
| Deposition rate of tin (g/m²) | 0.7 | 0.7 | 0.7 | 0.7 |
| Nickel under coat (mg/m²) | 70 | 70 | 70 | 70 |
| Rate of tin in tin layer (g/m²) | 0.192 | 0.192 | 0.192 | 0.192 |
| State of tin layer | Island-like | Island-like | Island-like | Island-like |
| Weldability | AA | AA | AA | AA |
| Adhesive | Polyester/aminoplast = 80:20 | Acrylic/aminoplast = 80:20 | Epoxy/phenol = 80:20 | Epoxy/phenol = 80:20 |
| Coat compensation | Epoxy-phenolic coating | Epoxy-phenolic coating | Polyester powder | Tape-like PET film |
| ERV (mA) | 0.1 | 0.1 | 0.1 | 0.1 |
| Dissolution of iron | AA | AA | AA | AA |
| Corrosion of inner surface of can body | AA | AA | AA | AA |
| Flavor | AA | AA | AA | AA |

Weldability: AA=Good, BB=Poor.
Dissolution of iron: AA=Not dissolved, BB=Dissolved.
Corrosion of inner surface of can body: AA=Not corroded, BB=Somewhat corroded.
Flavor: AA=Not changed, BB=Somewhat changed.

EXAMPLE 7

After chromium was plated on both sides of a steel sheet having a thickness of 0.2 mm at a deposition rate of 80 mg/m² to form a chromium under coat, tin was plated on the under coat at a deposition rate of 0.25 g/m² to prepare a tinned steel sheet. In the tinned steel sheet, a tin deposit is evenly formed on the surface of a base steel sheet on which the under coat has been formed, and a chromate treatment is further conducted on the tin deposit.

A welded can was obtained in the same manner as in Example 1 except that the thus-prepared tinned steel sheet was used. In a metal blank produced from the tinned steel sheet, 0.05 g/m² of tin only changes into a tin-iron alloy at a stage before welding, and a tin layer having a tin deposition rate of 0.20 g/m² remains formed.

The ERV of the thus-obtained welded can was measured. As a result, it was confirmed that the welded can had no metal-exposed portion on its surface and the adhesion of the film was hence good. The ERV of the welded can is shown in Table 4.

Using the welded can, a sealed can was then produced in the same manner as in Example 1. The sealed can was subjected to a heat sterilization treatment and stored for 6 months at room temperature. Thereafter, the sealed can was opened to investigate whether iron dissolved out in the contents, the inner surface of the can body was corroded and the flavor of the contents changed. The results are shown in Table 4.

TABLE 4

|  | Example 7 |
| --- | --- |
| Deposition rate of tin (g/m²) | 0.25 |
| Chromium under coat (mg/m²) | 80 |
| Rate of tin in tin-iron layer (g/m²) | 0.05 |
| Rate of tin in tin layer (g/m²) | 0.20 |
| Weldability | AA |
| ERV (mA) | 0.1 |
| Dissolution of iron | AA |
| Corrosion of inner surface of can body | AA |
| Flavor | AA |

Weldability: AA=Good, BB=Poor.
Dissolution of iron: AA=Not dissolved, BB=Dissolved.
Corrosion of inner surface of can body: AA=Not corroded, BB=Somewhat corroded.
Flavor: AA=Not changed, BB=Somewhat changed.

What is claimed is:

1. A welded can in which protective coating is formed on a portion of a surface-treated tinned steel sheet corresponding to at least an inner surface of a can body, comprising:
a tin plating on the surface of a base steel sheet, said tin being deposited at a deposition rate of 0.5–1.7 g/m² to form said surface-treated tinned steel sheet;
a biaxially oriented polyester film having a thickness of 5–50 μm adhered to said surface-treated tinned steel sheet with a thermosetting resin adhesive selected to harden at a predetermined temperature t in the range of 180° C.<t<210° C., thereby forming a first protective coating on said surface-treated tinned steel sheet without dissolving of iron out of said tinned steel sheet, said first protective coating being applied completely over at least one side of said surface-treated tinned steel sheet with the exception of two respective end portions thereof;
said respective end portions being welded together to form said can body having said first protective coating formed on at least the inner surface of said can body, wherein said end portions have at least one layer each of a tin-iron alloy layer having a deposition rate of 0.35–1.60 g/m² in terms of tin content followed by a tin layer having a tin deposition rate of 0.10–1.35 g/m² at a stage after adhesion of the polyester film but before welding of said end portions together; and another protective coating applied to a portion of said inner surface at a location where said respective end portions are welded together.

2. The welded can as claimed in claim 1, wherein the thermosetting resin adhesive is composed of one of epoxy resins, phenolic resins, acrylic resins, aminoplast resins, polyester resins, urethane resins and polysiloxane resins, or a mixture of two or more resins.

3. The welded can as claimed in claim 1, wherein the thermosetting resin adhesive is composed of a mixture of an epoxy resin and a phenolic resin in a weight ratio of 50:50 to 98:2.

4. The welded can as claimed in claim 1, wherein the thermosetting resin adhesive is composed of a mixture of a polyester resin and an aminoplast resin in a weight ratio of 50:50 to 98:2.

5. The welded can as claimed in claim 1, wherein the thermosetting resin adhesive is composed of a mixture of an acrylic resin and an aminoplast resin in a weight ratio of 50:50 to 98:2.

6. The welded can as claimed in claim 1, wherein the polyester film is a polyethylene terephthalate film.

7. A welded can in which a protective coating is formed on a portion of a surface-treated tinned steel sheet corresponding to at least an inner surface of a can body, comprising:
   a surface of a base steel sheet coated with an under coat composed of a metallic nickel;
   a tin plating on said under coat, said tin being deposited at a deposition rate of 0.5–1.7 g/m² to form said surface-treated tinned steel sheet;
   a biaxially oriented polyester film having a thickness of 5–50 μm adhered to said surface-treated tinned steel sheet with a thermosetting resin adhesive selected to harden at a predetermined temperature t in the range of $180°\text{C.}<t<210°\text{C.}$, thereby forming a first protective coating on said surface-treated tinned steel sheet without dissolving of iron out of said tinned steel sheet, said first protective coating being applied completely over at least one side of said surface-treated tinned steel sheet, said first protective coating being applied completely over at least one side of said surface-treated tinned steel sheet with the exception of two respective end portions thereof;
   said respective end portions being welded together to form said can body having said first protective coating formed on at least the inner surface of said can body, wherein said end portions have a tin layer having a deposition rate of at least 0.10 g/m² and formed with it distributed in a range of 10–60% of the surface area of the base steel sheet at a stage after adhesion of the polyester film but before welding of said end portions together; and
   another protective coating applied to a portion of said inner surface at a location where said respective end portions are welded together.

8. The welded can as claimed in claim 7, wherein the thermosetting resin adhesive is composed of one of epoxy resins, phenolic resins, acrylic resins, aminoplast resins, polyester resins, urethane resins and polysiloxane resins, or a mixture of two or more resins.

9. The welded can as claimed in claim 7, wherein the thermosetting resin adhesive is composed of a mixture of an epoxy resin and a phenolic resin in a weight ratio of 50:50 to 98:2.

10. The welded can as claimed in claim 7, wherein the thermosetting resin adhesive is composed of a mixture of a polyester resin and an aminoplast resin in a weight ratio of 50:50 to 98:2.

11. The welded can as claimed in claim 7, wherein the thermosetting resin adhesive is composed of a mixture of an acrylic resin and an aminoplast resin in a weight ratio of 50:50 to 98:2.

12. The welded can as claimed in claim 7, wherein the polyester film is a polyethylene terephthalate film.

13. A welded can in which a protective coating is formed on a portion of a surface-treated tinned steel sheet corresponding to at least an inner surface of a can body, comprising:
   a surface of a base steel sheet coated with an under coat composed of a metallic chromium;
   tin evenly plated on said under coat at a deposition rate of 0.1–1.7 g/m² to form said surface-treated tinned steel sheet;
   a biaxially oriented polyester film having a thickness of 5–50 μm adhered to said surface-treated tinned steel sheet with a thermosetting resin adhesive selected to harden at a predetermined temperature t in the range of $180°\text{C.}<t<210°\text{C.}$, thereby forming a first protective coating on said surface-treated tinned steel sheet without dissolving of iron out of said tinned steel sheet, said first protective coating being applied completely over at least one side of said surface-treated tinned steel sheet with the exception of two respective end portions thereof;
   wherein respective end portions of said surface-treated tinned steel sheet are welded together to form said can body; and
   another protective coating applied to a portion of said inner surface at a location where said respective end portions are welded together, wherein the tin is deposited evenly on the end portions at a deposition rate of at least 0.10 g/m and is distributed in a range of 10–60% of the surface area of the base steel sheet at a stage after adhesion of the polyester film but before welding of said end portions together.

14. The welded can as claimed in claim 13, wherein the thermosetting resin adhesive is composed of one of epoxy resins, phenolic resins, acrylic resins, aminoplast resins, polyester resins, urethane resins and polysiloxane resins, or a mixture of two or more resins.

15. The welded can as claimed in claim 13, wherein the thermosetting resin adhesive is composed of a mixture of an epoxy resin and a phenolic resin in a weight ratio of 50:50 to 98:2.

16. The welded can as claimed in claim 13, wherein the thermosetting resin adhesive is composed of a mixture of a polyester resin and an aminoplast resin in a weight ratio of 50:50 to 98:2.

17. The welded can as claimed in claim 13, wherein the thermosetting resin adhesive is composed of a mixture of an acrylic resin and an aminoplast resin in a weight ratio of 50:50 to 98:2.

18. The welded can as claimed in claim 13, wherein the polyester film is a polyethylene terephthalate film.

* * * * *